United States Patent

Tillmann et al.

[15] 3,648,221

[45] Mar. 7, 1972

[54] MULTILAYER PROGRAMMABLE WIRING BOARD

[72] Inventors: Hans Peter Tillmann, Bruxelles; Erik Lerchs, Rhode St. Genese, both of Belgium

[73] Assignee: Burndy Corporation

[22] Filed: Mar. 12, 1970

[21] Appl. No.: 18,886

[30] Foreign Application Priority Data

Aug. 7, 1969 Belgium....................................77670

[52] U.S. Cl. ........................339/74 R, 339/75 M, 339/176 M

[51] Int. Cl. ........................................................H01r 13/54

[58] Field of Search ......................................339/74, 75, 176

[56] References Cited

UNITED STATES PATENTS 3,090,026 5/1963 Raddin..............................339/75 MP 2,978,666 4/1961 McGregor..........................339/117 P 3,188,598 6/1965 Pferd.................................339/75 MP

OTHER PUBLICATIONS

IBM Technical Disclosure Bulletin, Pittwood et al., Vol. 12, No. 8, 1/1970, p. 1210

*Primary Examiner*—Joseph H. McGlynn
*Attorney*—Howard S. Reiter

[57] ABSTRACT

An electrical connector assembly includes an arcuate conductive spring element mounted to a body, and a rotary cam mounted to the body for expanding the effective curvature of the spring until it engages the surfaces of adjacent intersecting printed circuit boards. The spring forms a separable electrical connecting tab between a conductor on one board and a conductor on the other. Means on the body are provided for supporting circuit boards or similar conductors in proper position relative to one or more spring elements.

8 Claims, 8 Drawing Figures

MULTILAYER PROGRAMMABLE WIRING BOARD

This invention relates to a device for establishing electrical connections between conductive surfaces which are disposed in substantially adjacent intersecting planes. Printed circuit board installations frequently require electrical connections of this type.

Previously, such connections have relied upon permanent couplings using solder joints, or upon separable couplings which required relative motion of one of the planar surfaces. Often in the prior art, such a connection would involve a device, permanently coupled to one circuit board, into which another board could be inserted in sliding engagement with a contact.

The permanent couplings intended to be inflexible and easily broken, while the separable connections produced forcible rubbing and sliding motions which often damaged fragile circuit board conductors.

Now, this invention provides a positive connection, between angularly positioned conductors, which is separable, relatively flexible, and which does not employ harmful sliding contact with the conductors. It is also inexpensive to build and install, and it is simple to operate.

A feature of this invention is a generally arcuate contact element of flexible spring material which expands in diameter, by flexing under the action of a rotary cam, so as to engage the adjacent surfaces of a pair of angularly positioned conductors.

Another feature is a housing for the arcuate contact which includes a detent to hold the contact in its expanded position.

These and other features of this invention are specifically pointed out in the following description, and are illustrated in the accompanying drawings, in which.

Figure 2:
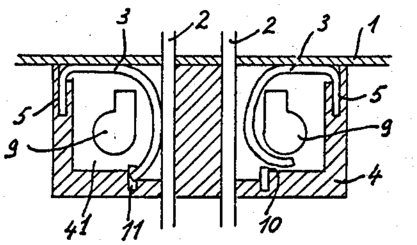
FIGS. 2 and 3 show the contacts, cam, and housing of an embodiment of this invention, in cross section, in different stages of operation relative to a pair of planar conductors.
Figure 3:
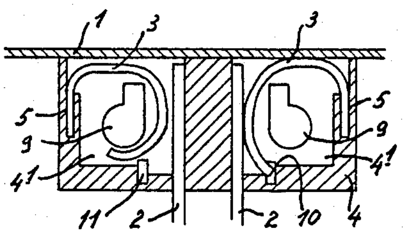
Figure 4:
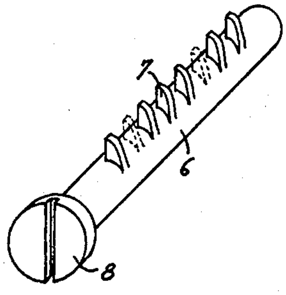
FIG. 4 shows a cam element suitable for use in a multicontact connector such as shown in FIG. 1.
Figure 8:
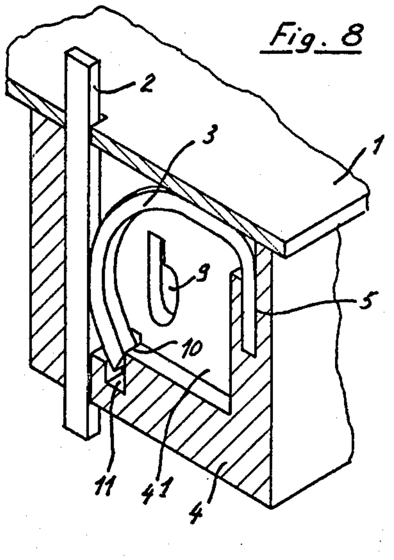
FIG. 8 is a pictorial representation, in cross section, of a contact, a housing, and coupled conductors, similar to FIG. 2.

Now, referring to the drawings in more detail, and specifically to FIGS. 2, 3 and 8, it can be seen that one embodiment of this invention comprises a housing 4 which is provided with an arcuate contact element 3 of flexible spring material, and with a journal opening 9 which receives the operating cam 6, shown in FIG. 4.

Figure 1:
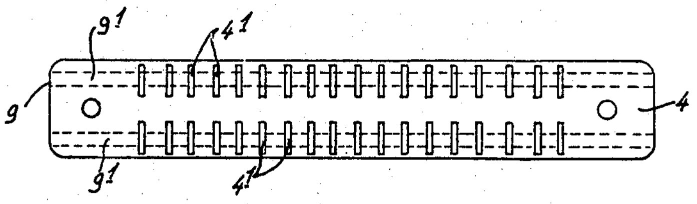
FIG. 1 is a front view of a connector device in accordance with this invention, showing a housing, and slots in the housing for contact elements.
Figure 5:
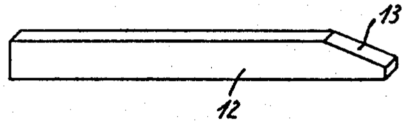
FIG. 5 shows a key element used for disengaging contacts in the connector of FIG. 1 after they have been latched in engaged position.

The contact element 3 is located within a slot 4′ which opens through an aperture in the front face of the housing 4 as shown in FIG. 1. A detent shoulder 10 is provided within slot 4′ for retaining contact element 3 in a flexed position. And, slot 4′ is provided with a lateral channel 11, which adjoins detent shoulder 10, to receive the releasing key 12, shown in FIG. 5.

As is suggested in FIG. 1, the housing 4 may be constructed to include a plurality of slots 4′ arranged in rows, and to include plural journal openings 9′, one for each row. This illustrates a multicontact embodiment of this invention. Lateral release channels 11 may be formed in the housing of FIG. 1, each substantially parallel to openings 9′ and connecting each of the slots 4′ in a row. This permits insertion of an elongate release key 12 which can be made long enough to reach every slot.

In use, the housing 4 may be positioned with the front face abutting against one or more primary surfaces 1. And, secondary conductors 2, extending at substantially right angles to conductors 1, are arranged to extend into the slots 4′ adjacent to contact elements 3, through apertures in the housing.

This arrangement defines a locating means which positions the conductors 1, 2 in proper relation to slots 4′ and to contact elements 3. In effect, the intersecting planes of the conductors are located so as to include the contact element in the angle formed between them. Engagement with either or both of the adjacent conductor surfaces then is achieved by flexible expansion of the arcuate contact element.

One end of each contact element is fixed by securing to the housing at an anchor portion 5. The other end extends in an arc as a relatively free cantilever in the area of detent shoulder 10. Each contact is a flexible resilient spring which defines an arc portion with a certain radius of curvature at each point along its length. The portion can be flexed elastically from the relaxed position so as to increase the radius of curvature.

The contact elements are operated to engage conductors 1 and 2 by means of operating cam 6. Radial projections 7 are positioned along the shaft of the cam, and the whole can be rotated by gripping the head portion 8. When the cam is rotated within journal opening 9, radial projections 7 engage the inner surfaces of the contact elements and flex them from their relaxed position. The curvature of each contact element increases until conductors 1 and 2 are engaged, and the free end is forced over detent shoulder 10. Then, the resiliency of the contact material locks the free end back against the shoulder and the contact element is held in flexed position, touching conductors 1 and 2.

Release from engagement with detent shoulder 10 is accomplished by use of release key 12. The key is provided with an inclined cam surface 13 at its forward end. As the key is inserted laterally into cavity 11, inclined cam surface 13 applied transverse force to the free end of each contact element parallel to the surface of shoulder 10. This force eventually lifts the free end past the edge of shoulder 10 and allows the contact element to return to the relaxed position.

Figures 6, 7:
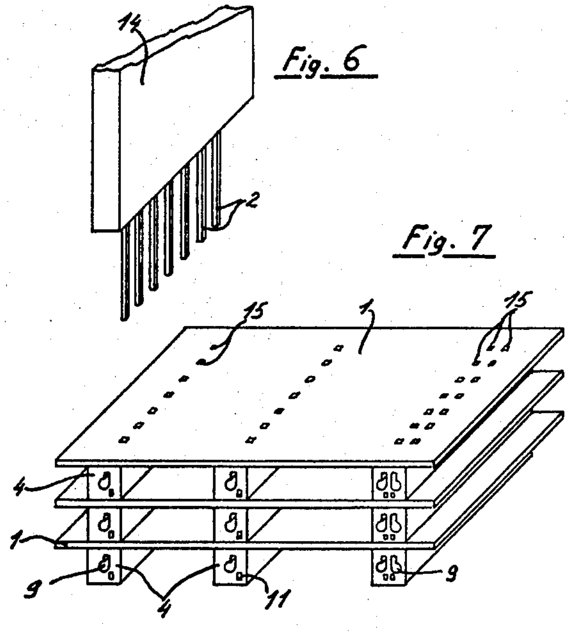
FIG. 6 shows a group of extending conductors of the type which can be electrically coupled with this invention.
FIG. 7 shows an application of this invention in which a plurality of connectors are positioned to interconnect a plurality of circuit boards and conductors.

The preceding two paragraphs describe how to establish and release electrical connections between conductors, disposed in substantially adjacent intersecting planes, in accordance with this invention. Application of the invention can be extended, as suggested in FIGS. 6 and 7, to banks of substantially rigid conductors 2 supported on a base 14, which are adapted for insertion through aligned apertures 15 in stacks of circuit conductor boards 1. Such an assembly may be employed as a programmable interconnection center through use of operating cams 6 having different combinations of projections 7.

This invention has thus been described but it is desired to be understood that it is not confined to the particular forms or usages shown and described, the same being merely illustrative and that the invention may be carried out in other ways without departing from the spirit of the invention; therefore, the right is broadly claimed to employ all equivalent instrumentalities coming within the scope of the appendent claims, and by means of which objects of this invention are attained and new results accomplished, as it is obvious that the particular embodiments herein shown and described are only some of the many that can be employed to obtain these objects and accomplish these results.

What is claimed is:

1. An electrical connector, operable to establish an electrical path between conductor surfaces positioned in adjacent intersecting planes, comprising:
   - a substantially arcuate contact element of flexible spring material having a given radius of curvature when in the unflexed state;
   - a housing having a slot containing said contact element with locating means to locate a pair of conductor surfaces in adjacent intersecting planes which are in substantially fixed relationship to said slot; and
   - cam means including a rotary shaft with eccentric radial projections, coupled to said housing, operable to increase the radius of curvature of said arcuate contact element by flexing, for urging said contact element toward engagement with conductor surfaces located in said adjacent intersecting planes.

2. An electrical connector in accordance with claim 1, wherein said housing includes a journal opening into which said cam means is inserted.

3. An electrical connector in accordance with claim 1, wherein said contact element includes a substantially fixed end portion secured to said housing, and a free end portion extending in an arc.

4. An electrical connector in accordance with claim 3, wherein said housing includes a detent shoulder within said slot, positioned to engage and retain the said free end of said contact element in a flexed position following operation of said cam means.

5. An electrical connector in accordance with claim 4, wherein said housing further includes a release channel adjacent to said detent shoulder, through which manual force is applied to disengage said free end of said contact element from said detent shoulder.

6. An electrical connector in accordance with claim 1, wherein:

said housing includes a plurality of slots in parallel, side-by-side, spaced-apart relationship;

a plurality of arcuate contact elements of flexible spring material are provided, one in each slot;

said cam means comprises a rotatable shaft having a plurality of eccentric radial projections disposed in axially spaced-apart relationship;

and, said journal opening extends into said housing through said slots, with said rotatable shaft inserted to position said eccentric radial projections within said slots for engagement with said contact elements.

7. An electrical connector in accordance with claim 6, wherein:

each contact element includes a substantially fixed end portion secured to said housing and a free end portion extending in an arc;

said housing further includes a plurality of detent shoulders, one in each slot, to engage and retain the said free end of each contact element in a flexed position following operation of said cam means; and, said housing still further includes a release channel extending into said housing through said slots adjacent to said detent shoulders, through which manual force is applied to disengage the said free ends of said contact elements from said detent shoulders.

8. An electrical connector in accordance with claim 7, further including an elongate release key element laterally insertable into said release channel and having an inclined camming surface at one end thereof for applying transverse release forces to the said free ends of said contact elements upon insertion into said release channel.

* * * * *